United States Patent [19]

Jones et al.

[11] 4,004,775

[45] Jan. 25, 1977

[54] PLUG VALVE

[75] Inventors: Lloyd K. Jones; David A. Yanov, both of Morgantown, W. Va.

[73] Assignee: Elk Manufacturing Company, Inc., Morgantown, W. Va.

[22] Filed: Feb. 6, 1975

[21] Appl. No.: 547,697

Related U.S. Application Data

[63] Continuation-in-part of Ser. No. 411,246, Oct. 31, 1973, Pat. No. 3,874,637.

[52] U.S. Cl. .............................. 251/310; 251/345; 251/287; 251/288
[51] Int. Cl.² ...................... F16K 5/04; F16K 27/06
[58] Field of Search ............ 251/310, 345, 287, 288

[56] References Cited

UNITED STATES PATENTS

| | | | |
|---|---|---|---|
| 1,043,935 | 11/1912 | Hitchcock | 251/310 |
| 1,126,706 | 2/1915 | Coffin | 251/310 |
| 1,160,342 | 11/1915 | Taft | 251/310 |
| 1,532,251 | 4/1925 | Lorraine | 251/310 |
| 2,178,676 | 11/1939 | Williams | 251/287 |
| 2,256,416 | 9/1941 | Stockstill | 251/310 |
| 2,631,002 | 3/1953 | Mueller | 251/310 |
| 3,038,695 | 6/1962 | Wildern | 251/287 |
| 3,426,795 | 2/1969 | Muller | 251/310 |
| 3,467,132 | 9/1969 | Parisi | 251/288 |

FOREIGN PATENTS OR APPLICATIONS

| | | | |
|---|---|---|---|
| 666,966 | 7/1963 | Canada | 251/287 |
| 964,455 | 7/1964 | United Kingdom | 251/310 |

*Primary Examiner*—William R. Cline
*Assistant Examiner*—H. Jay Spiegel
*Attorney, Agent, or Firm*—Parmelee, Miller, Welsh & Kratz

[57] ABSTRACT

A liquid or fluid-flow control valve of four-part construction is shown having a longitudinally extending, open-end housing within which a plug-like stationary seating part is centrally positioned to direct fluid flow between end and side-positioned inlet and outlet portions of the housing and as controlled by a rotatable stem part having a sleeve portion that is positioned concentrically about the seating part. The stem part projects through one end of the housing and has a side port that is moved into and out of alignment with a side port in the seating part. The seating part is provided with an obliquely-positioned ringlike sealing gasket, and the stem and the seating parts are removably mounted within the housing part by an end-positioned cooperating bonnet part.

6 Claims, 6 Drawing Figures

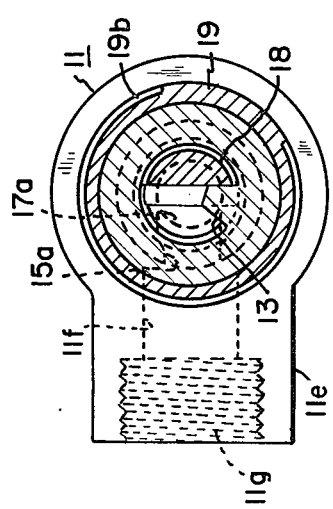
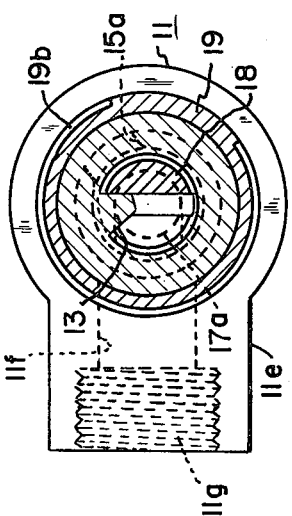
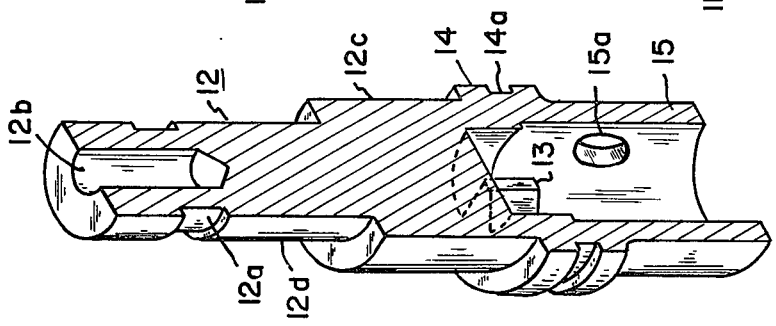
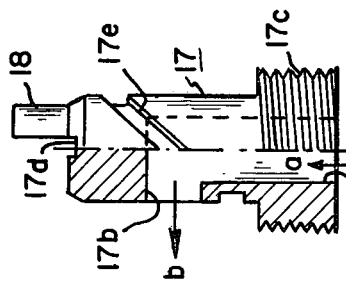
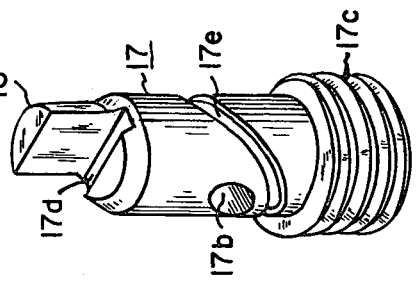
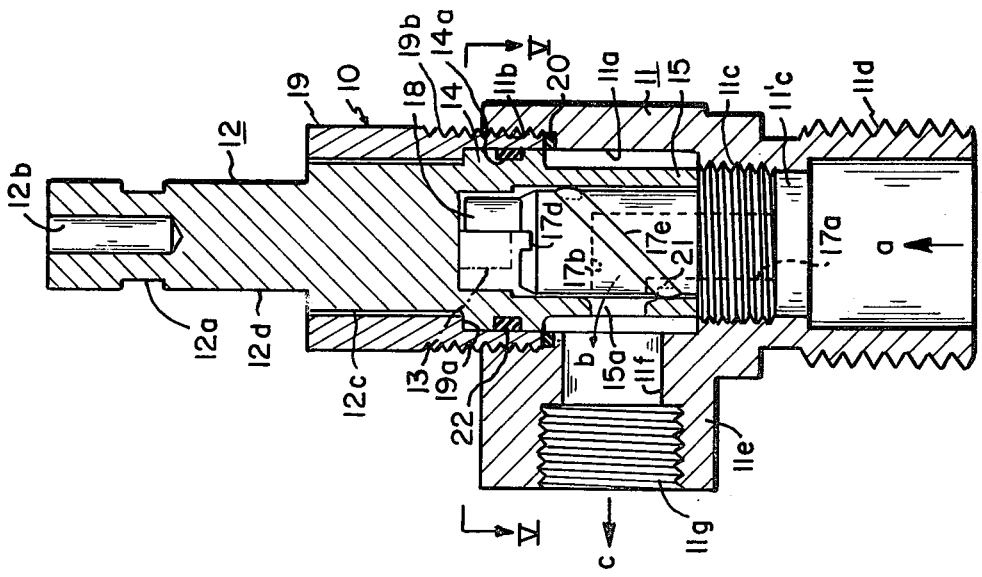

4,004,775

PLUG VALVE

CROSS-REFERENCE TO RELATED APPLICATION

This application is a continuation-in-part of our U.S. copending application, Ser. No. 411,246, filed Oct. 31, 1973, entitled "Improved Canted Gasket Valve Construction", now U.S. Pat. No. 3,874,637.

BACKGROUND OF THE INVENTION

1. Field of the Invention

This invention pertains to an improved, highly practical, manually operated, fluid control valve which utilizes a stationary, plug-like, angular flow-directing, passageway-defining seating part, and a stem part that fully encloses the periphery and one end of the seating part and is rotatable thereabout for controlling flow of fluid outwardly of the passageway. A phase of the invention deals with an improved flow direction changing valve that may be assembled and disassembled from one end of its housing without disconnecting its fluid inlet and outlet lines.

2. Description of the Prior Art

The common type of control valve for fluid flow, such as in household installations, employs a so-called compression type of sealing action. In this type, a resilient gasket is compressed by the use of a threaded stem that advances into and out of a sealing relation with a substantially planar seat in the valve body. There has been a need for a really simple, inexpensive and easily assembled and disassembled, efficient valve device or unit that will provide an improved type of sealing action without the need for a conventional compression seal and that will facilitate maintenance thereof.

An improved, straight-line flow type of valve unit is set forth in our copending application Ser. No. 411,246. It, like the present construction, employs an oblique type of flow controlling sealing gasket, but, on the basis of a requirement to restrict, deals particularly with a unit which provides a longitudinal through-flow passage of fluid therethrough.

SUMMARY OF THE INVENTION

It has thus been an object of the present invention to devise a relatively inexpensive, practical and simply assembled and disassembled control valve.

Another object has been to devise an improved combination of operating parts in a valve construction which will minimize friction, will enable a positive on and off controlled movement thereof, and will use an oblique type of sealing gasket.

A further object of the invention has been to devise a valve construction which will enable an angular or substantially 90° passage of fluid therethrough, as controlled by a pair of internally positioned, endwise-removable parts within a longitudinally extending housing.

A still further object of the invention has been to facilitate the repair and maintenance of a plug-like, angular, through-flow control valve, and particularly from the standpoint of avoiding the need for disconnecting either inlet or outlet lines that are connected thereto.

A still further object of the invention has been to make an improved utilization of a canted or obliquely positioned sealing gasket and of forces that are involved in its utilization.

These and other objects will appear to those skilled in the art from the illustrated embodiment and the claims.

BRIEF DESCRIPTION OF THE DRAWINGS

In the drawings,

FIG. 1 is a side sectional view in elevation illustrating the invention, showing the parts thereof in a fully open, through-flow positioning as indicated by arrows;

FIG. 2 is a side view in elevation and partial section of a centrally positioned, plug-like seating part of the valve shown in FIG. 1 and on the same scale as such figure;

FIG. 3 is an isometric view in elevation of a stationary plug-like seating part shown in and on the scale of FIGS. 1 and 2;

FIG. 4 is an isometric view in elevation and section of a stem part of the construction of and on the scale of FIG. 1;

FIGS. 5 and 6 are cross sectional views taken respectively along the line V—V of FIG. 1. FIG. 5 shows the valve construction in a fully open or through-flow relationship and FIG. 6 shows it in a fully closed-off relationship.

DESCRIPTION OF THE PREFERRED EMBODIMENT

A valve unit or device 10, as particularly shown in the assembled view of FIG. 1, of four-part construction has been provided. A housing 11 which is adapted to be secured in a fixed relation to fluid inlet and outlet lines is shown provided with a hollow, longitudinally, through-extending body which has an open inlet first end portion defined by an externally or male-threaded connector fitting 11d of enlarged diameter that opens through a bore portion 11'c of slightly smaller diameter and an internally or female threaded mouth portion 11c into a central chamber portion 11a. The housing 11 has an opposite open end portion 11b that is outwardly offset or recessed with respect to the central portion 11a to define a seating shoulder therewith for receiving a resilient, sealing, ring-like gasket 20 thereon. The open second end portion 11b is shown provided with internal or female threading to cooperate with external or male threading about a forward mounting end portion 19b of a sleeve-like mounting collar or bonnet part 19.

The housing 11 has, as shown in FIG. 1, a side-extending, transverse or 90°, open, outlet connector portion or fitting 11e. The portion 11e has an outlet bore 11f that is open to the central chamber portion 11a and extends outwardly to a slightly enlarged, internally or female-threaded mounting portion 11g for receiving a male-threaded end of an outlet pipe or the like.

A stationary plug-like seating part 17 of cylindrical shape, as particularly shown in FIGS. 1, 2 and 3, has an enlarged lower end portion 17c provided with male threading for mounting it in a stationary or non-rotatable relation within female-threaded portion 11c of the housing 11. The seating part 17 has a longitudinal or axial port or bore 17a centrally open at its one end to the inlet bore 11'c, and connected at its other end to a side, cross bore or port 17b in a transverse or 90° angular relation. It will be noted that the bores 17a and 17b are of the same reduced size or diameter to define an angular fluid flow path or passageway through the seating part 17. The port 17b is open to slight spacing between the outer periphery of the seating part 17 and the inner periphery of a longitudinally extending stem part 12. An oblique or canted, continuous groove portion 17e extends about the outer periphery of the seating part 17 in a diagonal, cross-extending relation with respect to the side port 17b to receive an annular or circular, resilient or rubber-like sealing gasket or ring 21 in an operating position therein. It will be noted that the gasket 21 extends along its length beyond the diameter of the outer periphery of the seating part 17, across the spacing between the seating and stem parts, to provide a wiping seal diagonally with respect to a side port 15a of the stem part 12.

As shown in FIGS. 1, 2, 3, 5 and 6, the upper or closed end of the plug-like seating part 17 is provided with a tool-receiving slot portion 17d (such as for a screwdriver) to facilitate its endwise insertion and removal and threaded-in mounting and dismounting from within the housing 11 through its upper or opposite open end portion. One side of the upper or closed end of the part 17 is provided with a semi-circular stop projection or lug-like segment 18 which extends longitudinally endwise or axially outwardly therefrom, and whose front planar face serves as a fixed abutment or stop for an endwise or axially depending stop lug 13 that is carried by the stem part 12. The stem part 12 (see FIG. 4) has a shell or sleeve portion 15 that is open at its one or lower end and closed at its opposite or upper end to concentrically fit over the sealing part 17 and enclose it about its periphery and at one end thereof. The stop lug 13 extends endwise from the back wall of the shell portion 15 for movement between positions represented by FIGS. 5 and 6, as controlled by its abutment with opposite side portions of the planar face of the fixed position lug 18.

FIG. 6 shows the valve in a fully closed position which involves 120° rotation of the stem part 12 about the seating part from a fully open position shown in FIG. 5. This provides means for positively effecting a full opening and closing relation of the operating stem part 12 of the valve unit 10. In its open position, the side port 17b is fully aligned with the side port 15a.

The operating stem part 12, as particularly shown in FIGS. 1 and 4, is of stepped construction, having a maximized diameter adjacent its open-end, sleeve or shell portion 15. A pair of spaced-apart bearing ring portions 14 project radially from the outer wall of the shell portion 15 adjacent its closed-off end to define an outermost, peripheral bearing area for journaling the stem part 12 within the housing part 11 and directly within innermost open end portion of the bonnet part 19. A circular groove portion 14a provides spacing between the bearing ring portions 14 for receiving an annular, resilient gasket 22 that seals-off the joint between the stem part 12 and the bonnet part 19. Portions 14 thus serve as friction-minimizing bearing or journaling surfaces for rotative movement of the stem part 12, to minimize turn-initiating resistance and facilitate an easy operation of the valve between its open to closed positions.

The sleeve portion 15 fits about and over the plug-like seating part 17 in a concentric relation with respect thereto and with respect to the central chamber of the housing 11 and defines a slight spacing with the outer wall of the part 17 which serves as a pressure equalizing chamber. The side port 15a through the wall of the shell portion 15, as shown in FIG. 1, has relief beveling towards the side outlet port 17b to, when the side port 15a is in full alignment with the side port 17b, provide a smooth through-flow, indicated by the arrows a, b and c of FIG. 1. As also shown in this FIGURE, the wall edge about the open end of the shell portion is adapted to rest upon a ledge that is defined between the main body of the seating part 17 and the enlarged, threaded mounting portion 17c thereof.

The stem part 12 has a cylindrical solid body portion 12c that is shown as having the same outer diameter as the shell portion 15 and as separated therefrom by the bearing portions 14. As indicated in FIG. 1, the portions 14 and 12c extend along the inner diameter of bonnet or mounting collar part 19. A ledge defined between an outwardly recessed inner peripheral portion of the inner end portion of the bonnet 19 and its main inner periphery serves to provide a complementary relation such that the stem part 12 is retained in an operating position within the bonnet 19. The area provided by the portions 14 of the stem part 12 is carried within the recessed, inner peripheral portion of the bonnet 19 in a journaled rotative relation. The complementary interfitting relation between wall portions of the stem and bonnet parts serves to enable a longitudinal-axial or endwise-insertion and removal of the parts 12 and 17, without disturbing any pipe connections to the inlet and outlet fitting portions 11d and 11e of the housing 11. The joint between the bonnet 19 and housing 11 may be sealed-off with flat, resilient ring-like gasket 20. As previously indicated, the joint defined between the bonnet 19 and the bearing portions 14 of the stem part is sealed-off by flat, resilient annular gasket 22 which is positioned within the groove portion 14a. The stem part 12 is provided with an outwardly extending operating shaft portion 12d of slightly reduced diameter, having a circular groove portion 12a and an end bore 12b to facilitate mounting a manual operating lever or wheel thereon.

With reference to FIG. 1, the positioning of the canted resilient gasket means 21 is such that when the operating stem part 12 is being rotated from the valve-closing to a valve-opening position, at the instant before the port 15a passes completely over the seal of the gasket, a small gap is presented such that the fluid or liquid may flow into the spacing or chamber defined between the inner periphery of the shell portion 15 and the outer periphery of the seating part 17. This causes an equalization of pressure on opposite sides of the gasket 21 when the opening movement is completed. When the valve 10 is closed, pressure on the upstream or inflow side of the gasket tends to keep it in a stretched sealing position. When the valve is being opened, fluid flowing between its shell portion 15 and the side port 17b forms a thin boundary layer which prevents the resilient seal from touching the inner wall of the shell portion 15 until the gasket 21 is safely over the internal radius of its port 15a, thus avoiding a shearing-away friction on the gasket 21. Referring to FIGS. 5 and 6, the spacing or recessing defined between the lugs 13 and 18 may be about 240° to provide for 120° opening and closing rotating movement of the operating stem part 12. Only a slight static friction is encountered in operating the valve due to the limited journaling area, as defined by the projecting ring-like bearing portions 14 of the stem part 12.

Although optimum efficiency is obtained by employing the end portion 11d as an inlet and employing the side portion 11e as an outlet, the employment may be reversed, if desired. That is, the valve 10 is also effective in opening and closing-off fluid flow, even when its direction is reversed.

We claim:

1. In an improved fluid-flow controlling valve whose operating parts may be fully assembled and disassembled without disconnecting either its fluid inlet or outlet fittings, a hollow longitudinally extending integral housing having an open first end portion providing a pipe connection inlet fitting and having an opposite open second end portion for the insertion and removal of all operating parts thereof, said housing having a central chamber portion between said open end portions, and having a side outlet portion open to said central chamber portion in substantially a right angular relation with respect to said open first end portion; said side outlet portion providing a pipe connection outlet fitting, a longitudinally extending stationary plug-like seating part adapted to be inserted and removably mounted within said central chamber portion through said opposite open second end portion to extend in a spaced relation concentrically within and along said central chamber portion, said seating part having an end port open to said first open end portion, and an open side port connected by an angular-shaped bore therein to said end port to define a fluid passageway therethrough; a rotatable operating stem part having a sleeve portion integral therewith at one end thereof that is adapted to be introduced through said open second that is adapted to be introduced through said open second end portion into a concentric rotatable operating position about said seating part within said central chamber portion, said sleeve portion having an open end facing towards and closed-off with respect to said open first end portion by said seating part, having a closed-off opposite end, and having an open side port for movement into and alignment with the open side port of said seating part, said stem part having a closed-off operating end portion providing a closed opposite end for said sleeve portion and extending therefrom outwardly through said second open end portion of said housing; said housing having threading about said open second end portion thereof, a bonnet part having threading that is complementary with the threading about said open second end portion for removably securing said bonnet part on said housing, said bonnet and stem parts having interfitting portions for removably retaining said stem part in an operating position within said housing and about said seating part, the interfitting portion of said bonnet being an outwardly offset recess portion, and the interfitting portion of said stem part being an outwardly projecting annular bearing portion in rotative engagement within said recess portion of said bonnet part; said sleeve portion being positioned in an inwardly spaced relation within said central chamber portion by said annular bearing portion, annular sealing gasket means operatively positioned diagonally between the outer periphery of said seating part and the inside of said sleeve portion for sealing-off spacing therebetween within said central chamber portion in a diagonally cross-extending relation with respect to the side port of said seating part, and said stem and seating parts being endwise-removable from said housing part through the opposite second end portion of said housing after said bonnet part has been unscrewed from said housing.

2. In an improved valve as defined in claim 1, annular sealing gasket means operatively positioned between said bonnet part and said bearing portion of said stem part and between said bonnet part and said housing for sealing-off joints therebetween.

3. In an improved valve as defined in claim 1, said seating part having a groove portion extending obliquely therealong for carrying said annular sealing gasket means therein, said sleeve portion having an inside rounded edge provided with a radius that has relief beveling towards the side outlet port of said seating part to assure a smooth throughflow of fluid when the said ports are in full alignment with each other and to facilitate rotative movement of said sleeve portion along said gasket means in a bypassing relation with respect to the open side port of said sleeve portion.

4. In an improved valve as defined in claim 1, said annular bearing portion of said stem part having a centrally disposed groove portion therealong dividing it into two ring-like portions, and an annular gasket positioned in said groove portion in engagement with an inner side of said bonnet part for sealing-off the joint therebetween.

5. In an improved valve as defined in claim 1, the one end of said seating part and said open first end portion of said housing having complementary threaded portions for removably mounting said seating part within said housing, and said seating part having a tool-receiving slot portion at its opposite end for receiving a tool entered through said open second end portion for facilitating its endwise-insertion and removal from within said housing.

6. In an improved valve as defined in claim 5 a stop projection within the closed-off opposite end of said sleeve portion, and a stop lug extending from the opposite end of said seating part for engaging said stop projection and limiting rotating movement of said stem part between open and closed fluid-flow positions with respect to said seating part.

* * * * *

UNITED STATES PATENT OFFICE
CERTIFICATE OF CORRECTION

PATENT NO. : 4,004,775
DATED : January 25, 1977
INVENTOR(S) : Lloyd K. Jones; David A. Yanov It is certified that error appears in the above-identified patent and that said Letters Patent are hereby corrected as shown below:

Column 5, line 28, delete "open".

Column 5, delete line 29.

Signed and Sealed this

Fifth Day of April 1977

[SEAL]

Attest:

RUTH C. MASON
*Attesting Officer*

C. MARSHALL DANN
*Commissioner of Patents and Trademarks*